United States Patent [19]

Doyle, Jr.

[11] 4,136,603

[45] Jan. 30, 1979

[54] DIAPHRAGM ASSEMBLY

[75] Inventor: Nicholas E. Doyle, Jr., Norwood, Mass.

[73] Assignee: The Foxboro Company, Foxboro, Mass.

[21] Appl. No.: 850,870

[22] Filed: Nov. 14, 1977

[51] Int. Cl.² ............................................. F01B 19/00
[52] U.S. Cl. ................ 92/98 R; 92/103 M; 228/107; 73/278
[58] Field of Search .............. 92/98 R, 103 R, 103 M; 228/107, 108; 73/278

[56] References Cited

U.S. PATENT DOCUMENTS

| | | | |
|---|---|---|---|
| 3,140,537 | 7/1964 | Popoff | 228/108 |
| 3,675,540 | 7/1972 | Murata et al. | 92/98 |
| 4,046,010 | 9/1977 | Akeley | 73/406 |

*Primary Examiner*—Edgar W. Geoghegan
*Attorney, Agent, or Firm*—Andrew T. Karnakis

[57] ABSTRACT

A diaphragm assembly for use in highly corrosive industrial applications includes a metal body subject to corrosion and a diaphragm formed of a corrosion resistant metal. The metal of the diaphragm is metallurgically incompatible with the body metal. The diaphragm is nevertheless hermetically sealed to the body with the aid of a transition member having a first portion of metal which is metallurgically compatible with the body and a second portion of another metal metallurgically compatible with the diaphragm. Both portions are joined together by a sound, molecular bond, as for example, by using explosive bonding techniques. The first portion of the transition member is fusion welded to the body and the diaphragm is similarly welded to the second portion, thereby presenting at the process fluid interface a barrier that consists solely of corrosion resistant metal.

14 Claims, 6 Drawing Figures

DIAPHRAGM ASSEMBLY

FIELD OF THE INVENTION

This invention relates in general to diaphragm assemblies, and more specifically to such assemblies used in process control instruments in which the diaphragm is exposed to highly corrosive fluids.

BACKGROUND OF THE INVENTION

Metal diaphragm assemblies have been widely employed in industrial instrumentation throughout the years as, for example, a primary element for sensing fluid pressure applied directly thereto, or as an isolation diaphragm in liquid filled systems in which the applied pressure is faithfully transmitted to some other pressure responsive member.

Regardless of the application of the diaphragm assembly, it is important for overall performance characteristics of the device that a hermetic, metallurgically sound bond be created between the diaphragm and its mounting body. In most process applications, such a bond is readily achieved by conventional techniques (e.g., fusion welding) because the diaphragm and mounting body are formed from the same metal, usually stainless steel.

However, when the pressures of many highly corrosive process fluids are to be measured, the diaphragm is usually made of tantalum or other similar chemically inert, expensive metal. To preserve manufacturing economy, it is highly desirable to retain the stainless steel mounting body in such corrosive applications.

As is well known in the art, the highly corrosion resistant metal diaphragm (e.g., tantalum) and the mounting body formed of a more chemically active metal (e.g., stainless steel) are metallurgically incompatible, i.e., the chemical and physical properties of the metals are substantially dissimilar so as not to be fusion welded by conventional techniques. Weldability as used herein refers to the formation of a sound, homogeneous, hermetic molecular bond along the point of contact between the two metals, as for example, when two metallurgically compatible molten metals are intermixed by fusion. Attempts to fusion weld incompatible materials usually result in the formation of nonhomogeneous zones of intermetallic compounds that are subject to brittleness and cracking.

The problem of providing a sound bond is further complicated by the fact that these diaphragm assemblies are sometimes required to withstand repeated temperature cycling over wide temperature extremes (e.g., $-40°$ F. to $700°$ F.), while at the same time retaining their hermiticity. Hence, other common joining techniques such as, swaging, press fitting and bonding by plastics, adhesives or grazing alloys are unacceptable for most industrial applications.

One simple way to provide a solution to the problem is to make the mounting body of the same inert metal as the diaphragm; however, as mentioned, this approach is extremely costly. Additionally, the overall size of such matched diaphragm assemblies cannot always be reduced to suit a particular cost situation because the size of the diaphragm usually has a bearing on the accuracy, response, sensitivity and range of the instrument.

In the past, significant effort has been directed to the problem as, for example, disclosed in U.S. Pat. No. 3,675,540, which proposes affixing a thin tantalum diaphragm to a stainless steel fixture by seamwelding the peripheral edges of the diaphragm to the fixture. It is well known that seamwelding in this manner will not produce a sound, hermetically sealed bond between the dissimilar metals, but rather one which contains intermetallic compounds and is thus structurally inferior to a fusion welded joint, and ultimately subject to premature failure by cracking. As this prior patent clearly discloses, additional support for mounting the diaphragm must be provided by tightly adhering the diaphragm to mating surfaces of its back-up fixture by means of a contraction or press fit.

A more recent attempt is found in U.S. Pat. No. 4,046,010, which suggests that a tantalum diaphragm can be hermetically sealed to a stainless steel body of a pressure transducer by a form of braze-welding. The braze-weld is formed by heating a stainless steel weld ring above its melting point, but below that of the tantalum diaphragm, whereby a "weld" is formed between the stainless steel ring and the body while the molten steel flows along the outer periphery of the diaphragm to produce a type of brazed area at the surface interface between the diaphragm and the steel body. It is apparent that this solution also suffers from serious drawbacks because the actual joint interface is still a brittle one of stainless steel and tantalum. Applicants in this patent disclosure had to provide corrosion protection for the stainless steel weld by means of an elastomeric seal located on the inner circumference between the diaphragm and the body so that the process fluid could not contact and hence destroy the exposed stainless steel ring and weld.

Notwithstanding all of the prior development efforts in this field, it is apparent that the need still exists for an improved diaphragm assembly capable of joining two dissimilar metals by a sound molecular bond that offers a maximum in reliability, safety and cost savings.

SUMMARY OF THE INVENTION

The present invention provides a new and improved diaphragm assembly wherein two metallurgically incompatible metals, one formed as a diaphragm of a metal that is resistant to corrosive attack from the process fluid, the other forming a mounting body of commonly used, less corrosion resistant metal, are hermetically sealed by a sound molecular bond so as to present at the process fluid interface a barrier that consists only of the corrosion resistant metal.

In a preferred embodiment of the invention to be described in more detail below, the diaphragm is tantalum metal and the mounting body is stainless steel. An annular transition member having along its inner circumference a ring of tantalum and a stainless steel outer ring joined to the tantalum by explosive bonding allows the steel outer portion to be fusion welded to the steel mounting body and the tantalum diaphragm to be similarly welded to the inner tantalum ring of the transition member, whereby a metallurgically sound bond of tantalum to tantalum is provided at the process fluid interface. Hence this bond may be directly exposed to the process without encountering any of the aforementioned deficiencies resulting from conventional dissimilar metal fusion joints.

PREFERRED EMBODIMENT

A description of the presently preferred embodiment of the invention is set forth below.

DRAWINGS

DESCRIPTION

Figure 1:
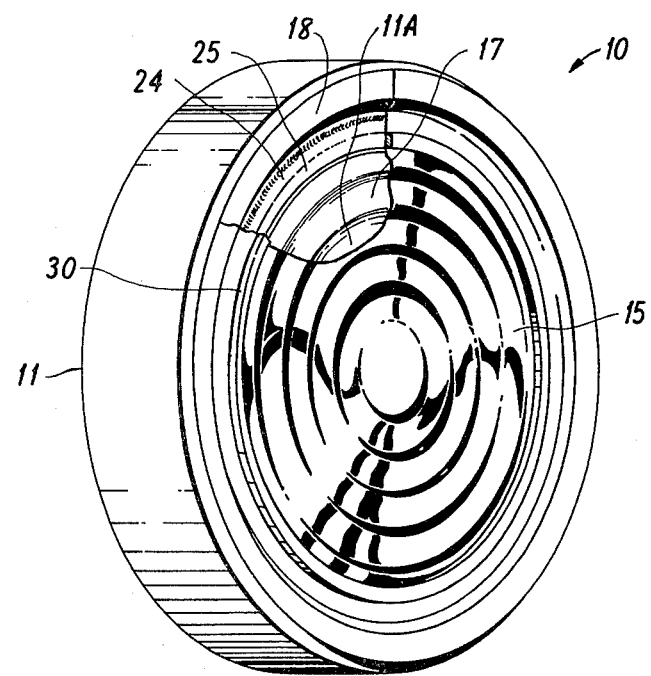
FIG. 1 is a perspective view, partially cut away, of a diaphragm assembly in accordance with the preferred embodiment of the invention.

The presently preferred embodiment of the invention may be best described with reference to FIGS. 1–3 of the drawings. A pressure-responsive diaphragm assembly 10 includes a circular mounting body 11 of stainless steel, whose front surface 11A is formed with a slightly concave area 12, and a convoluted diaphragm 15 of 0.005 inch thick tantalum metal uniquely affixed to the mounting body around the entire periphery of the concave area to define a chamber 17. The diaphragm extends beyond the chamber over a rim 18 of the front surface. To complete the assembly, two channels 13 and 14 communicate with the chamber and are used to pull a vacuum therein and subsequently back-fill the entire cavity with an appropriate fluid, e.g., silicone oil.

As mentioned, the dissimilarity in chemical and physical properties between stainless steel and tantalum, particularly the wide disparity in respective melting points of the two metals, as well as the fact that the tantalum diaphragm must be made very thin to provide accurate, repeatable performance make the problem of joining the two extremely difficult. However, the unique structure of the present invention, to be discussed in more detail below, permits the tantalum diaphragm to be hermetically sealed to its mounting body by fusion welding.

Figure 2:
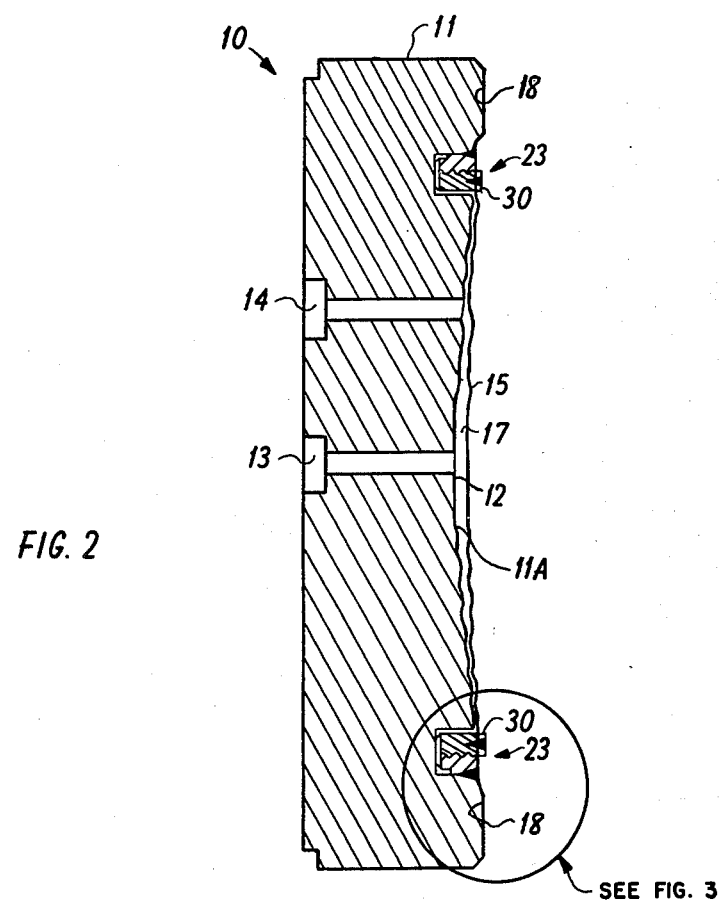
FIG. 2 is a vertical section of the embodiment of FIG. 1.
Figure 3:
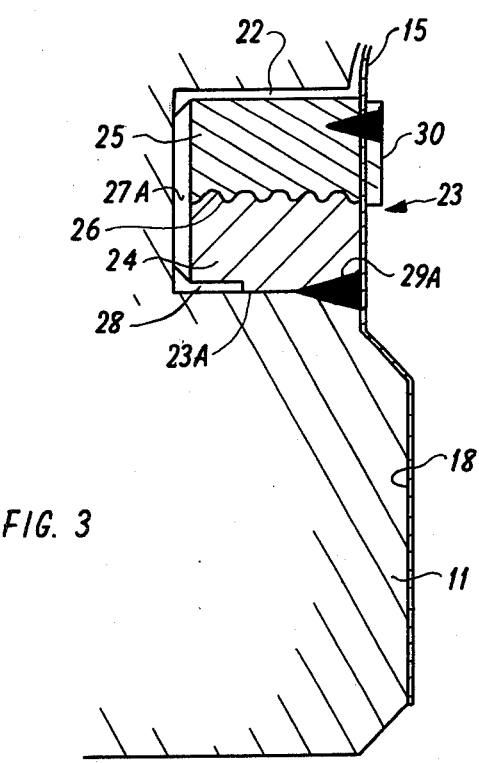
FIG. 3 is an enlargement of one end of the structure shown in FIG. 2.

Turning now more specifically to FIGS. 2 and 3, a circular recess 22 of generally rectangular cross section is machined in the mounting body 11 around the entire periphery of the concave area 12, but inside of the rim 18. An annular transition member 23 is composed of an outer region 24 of stainless steel and an inner portion 25 of tantalum joined by a sound, hermetic molecular bond along their point of contact 26, and has an outer diameter slightly greater than the diameter of the circular recess so as to press fit into the recess. The technique for fabricating such a transition member having two metallurgically incompatible metals joined by a sound molecular bond will be described subsequently below.

After insertion in the recess 22, the transition member 23 forms an interference fit with only one surface 23A of the mounting body 11 (see FIG. 3). This interference fit together with careful machining of the respective transition member and recess surfaces prepares and aligns the assembly for a fluid tight weld. As an aid in inserting the transition member, a relief 28 is notched at the rear of the stainless steel outer portion 24. A pair of radial grooves 27A, 180° apart, are formed in the transition member so that air and contaminants trapped within the recess may be removed during evacuation, through passageways 13 and 14, thereby enabling free access of the fill fluid to all portions of the recess and preserving the accuracy of the device during normal operation. Additionally, the "loose" fit of the remaining surfaces of the transition member in the recess allows the metals to freely move during temperature excursions such that no components and/or joints are unduly strained. Final assembly of the transition member is completed by electron beam welding the stainless steel outer region of the transition member to the mounting body along their contact point 29A.

Figure 4:
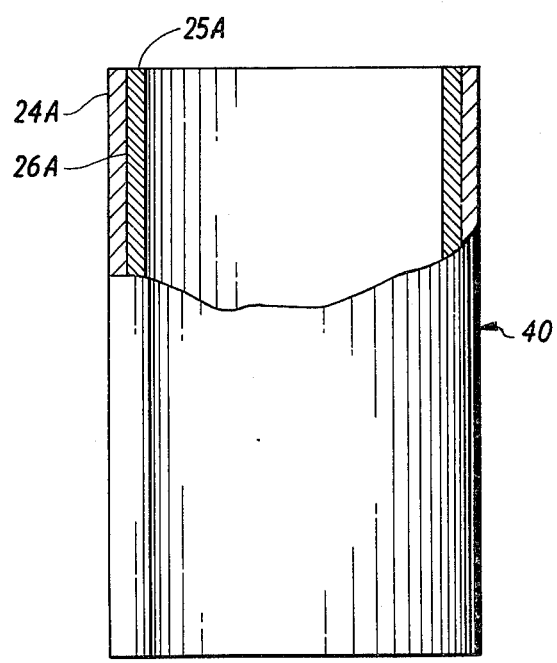
FIG. 4 shows a tubular member, partially cut away, of two dissimilar metals joined together with a sound molecular bond by explosive bonding used to fabricate a transition member in accordance with the invention.

The transition member 23 is fabricated from a tubular member 40 as shown in FIG. 4 which includes an inner tube 25A of tantalum and outer tube 24A of stainless steel. The two metallurgically incompatible metals (i.e., tantalum and stainless steel) are joined by a sound, hermetic molecular bond which extends uniformly along the region 26A of the adjacent surfaces of the two tubes by means of explosive bonding. Explosive bonding techniques for joining dissimilar metals and the soundness of the joints produced thereby are well known in the art. For a more detailed discussion of this subject, reference is made to an article entitled "Flow Configuration in Colliding Plates: Explosive Bonding" by George R. Cowan and Arnold H. Holtzman, in the Journal of Applied Physics, Volume 34, Number 4 (Part 1), April, 1963, pages 928–939, and to U.S. Pat. No. 3,140,537.

An accurately dimensioned and machined transition member 23 is cut from the tubular member 40 for insertion in the recess 22 and for weldment to the mounting body 11 as detailed above. The tantalum diaphragm 15 is then positioned over the front surface 11A of the mounting body and electron beam welded to the tantalum portion 25 of the transition member with the aid of a tantalum weld ring 30.

Thus the diaphragm assembly of the present embodiment provides a unique structure in which the process fluid is directly exposed to a metallurgically sound, highly reliable bond of tantalum to tantalum. In this manner, the device can be employed in strongly corrosive environments, and under repeated temperature cycling of a least from $-40°$ F. to $+700°$ F., while at the same time maintaining an effective seal at the bond between the two metals that allows no more than $2 \times 10^{-8}$ cc/sec of helium to leak through such bond under an applied pressure of 15 PSIG.

ALTERNATE EMBODIMENTS

Although a preferred embodiment has been set forth in detail above, it will be readily apparent to one of ordinary skill in the art that modifications may be made to the preferred form of the invention. For example, depending upon the particular operating condition, it may be desirable to use other corrosive-resistant metals, such as titanium or columbium, for the diaphragm material. Such metals can be soundly joined to other less-corrosive bodies, such as nickel, to form a diaphragm assembly in accordance with the principles of the present invention. Aside from the obvious variations of changing the shapes and sizes of various components, it may also become apparent to the skilled artisan that the dissimilar metals composing the transition member 23 may be effectively joined by diffusion bonding or hot isostatic press bonding or other similar process that yields a sound molecular bond between the dissimilar metals.

Figure 5:
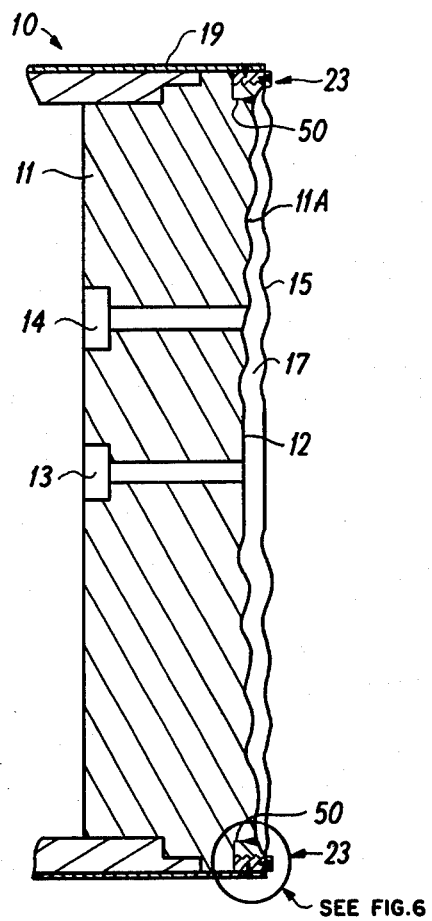
FIG. 5 is a view similar to that shown in FIG. 2 showing a modification in accordance with the invention.
Figure 6:
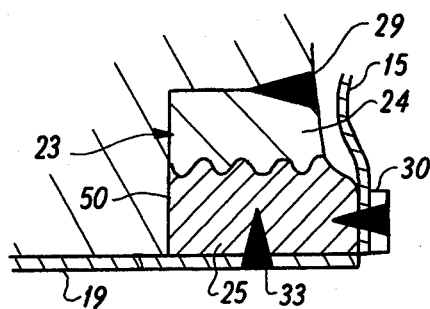
FIG. 6 is an enlargement of one end of the structure shown in FIG. 5.

As a still further indication of possible modifications, reference is now made to FIGS. 5 and 6 in which the same reference numerals identify corresponding portions of the structure shown in the preferred embodiment of FIGS. 1–3. This alternate form of the invention is particularly suited to those applications in which a significant portion of the diaphragm assembly projects inwardly into the process, as for example in some tank level gauging applications. Therefore, it is essential to protect the stainless steel mounting body 11 from chemical attack.

Instead of a circular recess as before, a notch 50 is machined along the periphery of the mounting body 11, and the tantalum portion 25 of the transition member 23 is disposed on the outside of the stainless steel region 24. The transition member is thus joined to the mounting body by a weld 29, and the tantalum diaphragm 15 extends to the periphery of the mounting body where it is welded as before to the tantalum portion of the transition member. A tubular sleeve 19 of tantalum surrounds the entire portion of the mounting exposed to corrosive attack and is secured thereto by a weld 33 in the tantalum ring 25.

In view of the above detailed description of the preferred form of the invention and in view of the above mentioned modifications thereto, other modifications, variations, advantages and uses will occur to one skilled in this art. Accordingly, the description and modifications presented hereinabove are to be considered as illustrative only, the true spirit and scope of the invention being that the defined by the claims appended hereto.

What is claimed is:

1. A diaphragm assembly for use with highly corrosive process fluids comprising:
   a metal body including means defining a chamber therein, said body being subject to corrosion;
   a diaphragm formed of a metal substantially resistant to corrosive attack, and being metallurgically incompatible with the metal of said body;
   a transition member having a first portion of metal which is metallurgically compatible with said body and an adjacent second portion of a different metal which is metallurgically compatible with said diaphragm, both of said portions being joined together by a sound, hermetic molecular bond;
   said first portion of said transition member being fusion welded to said body around said chamber;
   said diaphragm being hermetically sealed to said body by fusion welding to said second portion of said transition member, whereby said metal body is protected from said corrosive fluids by a highly reliable barrier consisting solely of metal resistant to chemical attack.

2. Apparatus as claimed in claim 1 wherein said first portion of said transition member is formed of the same metal as said body, said second portion of said transition member is formed of the same metal as said diaphragm.

3. Apparatus as claimed in claim 2 wherein said first portion is stainless steel and said second portion is tantalum.

4. Apparatus as claimed in claim 3 wherein said first and second portions are molecularly bonded together by explosive bonding.

5. An improved metal diaphragm assembly particularly suitable for use in a strongly corrosive environment comprising:
   a stainless steel body including means defining a chamber therein;
   a tantalum diaphragm formed to fit over said chamber, said diaphragm being metallurgically incompatible with said body;
   a transition member having a first portion of stainless steel and a second portion of tantalum molecularly bonded together;
   said first portion being bonded to said body around said chamber;
   said diaphragm being hermetically sealed to said second portion, thereby protecting said body from said corrosive environment.

6. Apparatus as claimed in claim 5 wherein said transition member is an annular ring having adjacent continuous portions of stainless steel and tantalum, said body being circular.

7. Apparatus as claimed in claim 6 wherein said adjacent portions are joined in a continuous molecular bond by explosive bonding techniques.

8. Apparatus as claimed in claim 7 including means defining a circular recess of generally rectangular cross section in said body around said chamber, said transition member being positioned within said recess.

9. Apparatus as claimed in claim 8 wherein said recess is disposed directly adjacent said chamber and inward from the periphery of said body.

10. Apparatus as claimed in claim 9 wherein said stainless steel portion of said transition member is disposed along the outer periphery thereof.

11. Apparatus as claimed in claim 10 wherein said transition member is press fit against only the outer surface of said recess, thereby enabling free movement of each of the metals of said assembly during temperature cycling.

12. Apparatus as claimed in claim 8 wherein said recess is disposed along the outer periphery of said body.

13. Apparatus as claimed in claim 12 wherein said stainless steel portion of said transition member is disposed along the inner periphery thereof.

14. Apparatus as claimed in claim 13 including a tubular sleeve of tantalum surrounding said body and secured thereto by fusion welding to said tantalum portion of said transition member.

* * * * *